(12) United States Patent
Naito

(10) Patent No.: US 9,300,001 B2
(45) Date of Patent: Mar. 29, 2016

(54) FUEL CELL STACK

(71) Applicant: HONDA MOTOR CO., LTD., Minato-ku, Tokyo (JP)

(72) Inventor: Hideharu Naito, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 105 days.

(21) Appl. No.: 14/258,647

(22) Filed: Apr. 22, 2014

(65) Prior Publication Data

US 2014/0322626 A1 Oct. 30, 2014

(30) Foreign Application Priority Data

Apr. 26, 2013 (JP) ................................. 2013-094672
Apr. 26, 2013 (JP) ................................. 2013-094674

(51) Int. Cl.
*H01M 8/24* (2006.01)
*H01M 8/10* (2006.01)

(52) U.S. Cl.
CPC ............ *H01M 8/2475* (2013.01); *H01M 8/248* (2013.01); *H01M 2008/1095* (2013.01); *H01M 2250/20* (2013.01); *Y02E 60/50* (2013.01); *Y02T 90/32* (2013.01)

(58) Field of Classification Search
CPC combination set(s) only.
See application file for complete search history.

(56) References Cited

U.S. PATENT DOCUMENTS

| | | | |
|---|---|---|---|
| 6,855,448 B2 * | 2/2005 | Kikuchi | H01M 8/247 180/68.5 |
| 2002/0034673 A1 | 3/2002 | Bisaka et al. | |
| 2003/0203269 A1 * | 10/2003 | Rock | H01M 8/2475 429/535 |
| 2005/0173170 A1 | 8/2005 | Miyajima et al. | |
| 2008/0102343 A1 | 5/2008 | Cho et al. | |
| 2009/0297920 A1 * | 12/2009 | Yoshitomi | H01M 8/2475 429/467 |
| 2010/0044133 A1 | 2/2010 | Jufuku et al. | |

FOREIGN PATENT DOCUMENTS

| | | |
|---|---|---|
| JP | 2001-143742 A | 5/2001 |
| JP | 2002-367651 A | 12/2002 |
| JP | 2004-247139 A | 9/2004 |
| JP | 2005-209468 A | 8/2005 |
| JP | 2006-108009 A | 4/2006 |
| JP | 2006-179293 A | 7/2006 |
| JP | 2006-221854 A | 8/2006 |
| JP | 2008-112708 A | 5/2008 |
| JP | 2008-132800 A | 6/2008 |
| JP | 4131311 B2 | 8/2008 |

OTHER PUBLICATIONS

Office Action and Search Report dated Nov. 24, 2015 issued over the corresponding Chinese Patent Application No. 201410171733.1 with English translation of pertinent portion.

* cited by examiner

*Primary Examiner* — Gregg Cantelmo
(74) *Attorney, Agent, or Firm* — Carrier Blackman & Associates, P.C.; William D. Blackman; Joseph P. Carrier

(57) ABSTRACT

In a fuel cell stack, fuel cells are stacked together in a stacking direction, and the stacked fuel cells are placed in a casing. An upper side panel of the casing includes an outer plate and an inner plate which are joined together. Flat plate members are interposed between the outer plate and the inner plate at positions corresponding to both end portions of the outer plate and the inner plate extending in the stacking direction. The flat plate members are thicker than the outer plate and the inner plate.

9 Claims, 16 Drawing Sheets

FUEL CELL STACK

CROSS-REFERENCE TO RELATED APPLICATIONS

This application is based upon and claims the benefit of priority from Japanese Patent Applications No. 2013-094672 filed on Apr. 26, 2013 and No. 2013-094674 filed on Apr. 26, 2013, the contents all of which are incorporated herein by reference.

BACKGROUND OF THE INVENTION

1. Field of the Invention

The present invention relates to a fuel cell stack including a plurality of fuel cells for generating electrical energy by electrochemical reactions of a fuel gas and an oxygen-containing gas. The fuel cells are stacked together in a stacking direction, and a pair of end plates are provided at both ends in the stacking direction.

2. Description of the Related Art

For example, a solid polymer electrolyte fuel cell employs a polymer ion exchange membrane as an electrolyte membrane, and the polymer electrolyte membrane is interposed between an anode and a cathode to form a membrane electrode assembly (MEA). The membrane electrode assembly and a pair of separators sandwiching the membrane electrode assembly make up a power generation cell for generating electricity. In use, typically, a predetermined number of the power generation cells are stacked together to form a fuel cell stack, e.g., mounted in a vehicle.

In particular, in the case where the fuel cell stack is used for the in-vehicle application, in addition to shocks and vibrations, external loads tend to be applied to the fuel cell stack. Therefore, in an attempt to achieve a desired rigidity of the entire fuel cell stack, structure where the fuel cell stack is placed in a box has been adopted. As a type of this structure, for example, fastening structure of a fuel cell stack as disclosed in Japanese Laid-Open Patent Publication No. 2008-112708 (hereinafter referred to as the conventional technique 1) is known.

In this fastening structure, as shown in FIG. 16, end plates 2a, 2b are tightly fixed to both of upper and lower end surfaces of a separator 1. Four outer surfaces excluding both of the upper and lower end surfaces of the separator 1 are detachably covered by a pair of U-shaped enclosure panels 3a, 3b. In the detachable fastening structure, recesses formed along circumferential surfaces of side surface portions of the end plates 2a, 2b and protrusions formed on upper and lower edges of the enclosure panels 3a, 3b are fitted together.

Further, for example, an in-vehicle fuel cell stack as disclosed in Japanese Laid-Open Patent Publication No. 2001-143742 (hereinafter referred to as the conventional technique 2) is known. The fuel cell stack has a mounting structure for mounting the fuel cell stack in a vehicle. The mounting structure includes fixed support means and movable support means. The fixed support means is provided on one of end plates positioned at one end of the fuel cell stack in the stacking direction for holding one of end plates on the vehicle through a rubber mount. The movable support means is provided on the other of the end plates positioned at the other end of the fuel cell stack in the stacking direction for holding the other of the end plates through a rubber mount in a movable manner with respect to the vehicle in the stacking direction.

SUMMARY OF THE INVENTION

However, in the conventional technique 1, since the pair of U-shaped enclosure panels 3a, 3b are used, the desired rigidity of the entire casing cannot be obtained. In particular, in the case where the fuel cell stack is used in a vehicle, the fuel cell stack may not withstand the external load undesirably.

Further, in the above conventional technique 2, the fixed support means is provided to protrude outward of the one end plate, and the movable support means is provided to protrude outward of the other end plate. In the structure, dedicated space for providing the fixed support means and the movable support means as mounting members are required at an installation location for providing the fuel cell stack (e.g., in the vehicle). Therefore, space for providing the fuel cell stack may become large undesirably.

An object of the present invention is to provide a fuel cell stack having lightweight and economical structure which is capable of bearing an external load reliably and protecting fuel cells suitably.

Further, another object of the present invention is to provide a fuel cell stack having compact and simple structure in which the fuel cell stack can be placed reliably at a desired installation location.

The fuel cell stack according to the present invention includes a plurality of fuel cells for generating electrical energy by electrochemical reactions of a fuel gas and an oxygen-containing gas. The fuel cells are stacked together horizontally in a stacking direction. A pair of end plates are provided at both ends of the fuel cells in the stacking direction. Side panels are fixed between the end plates.

In this fuel cell stack, each of the side panels includes a pair of press plates which are joined together, and flat plate members interposed between the press plates at positions corresponding to both end portions of the press plates extending in the stacking direction. The flat plate members are thicker than the press plates.

Further, according to another aspect of the present invention, a fuel cell stack includes a mounting structure for attaching the fuel cell stack to an installation location. The mounting structure includes two plates which are stacked together and arranged between bottoms of a pair of end plates, and plate members interposed between the two plates. Fastening portions for fixing the fuel cell stack to the installation location are provided on the plate members.

In the present invention, the flat plate members are interposed between the pair of press plates at positions corresponding to both end portions of the press plates extending in the stacking direction. The flat plate members are thicker than the press plates. The flat plate members function as reinforcement ribs. In the structure, it is possible to effectively reduce the thickness of the pair of press plates. Therefore, lightweight and economical structure can be adopted for the casing as a whole. Accordingly, the fuel cell stack can bear an external load reliably, and it becomes possible to protect the fuel cells suitably.

Further, in the present invention, the mounting structure includes two plates which are stacked together and arranged between bottoms of the pair of end plates, and the plate members are interposed between the two plates. Fastening portions are provided on the plate members. Thus, size reduction of the mounting structure is achieved, and the structure is simplified easily. Accordingly, with the compact and simple structure, it becomes possible to install the fuel cell stack at a desired installation location reliably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
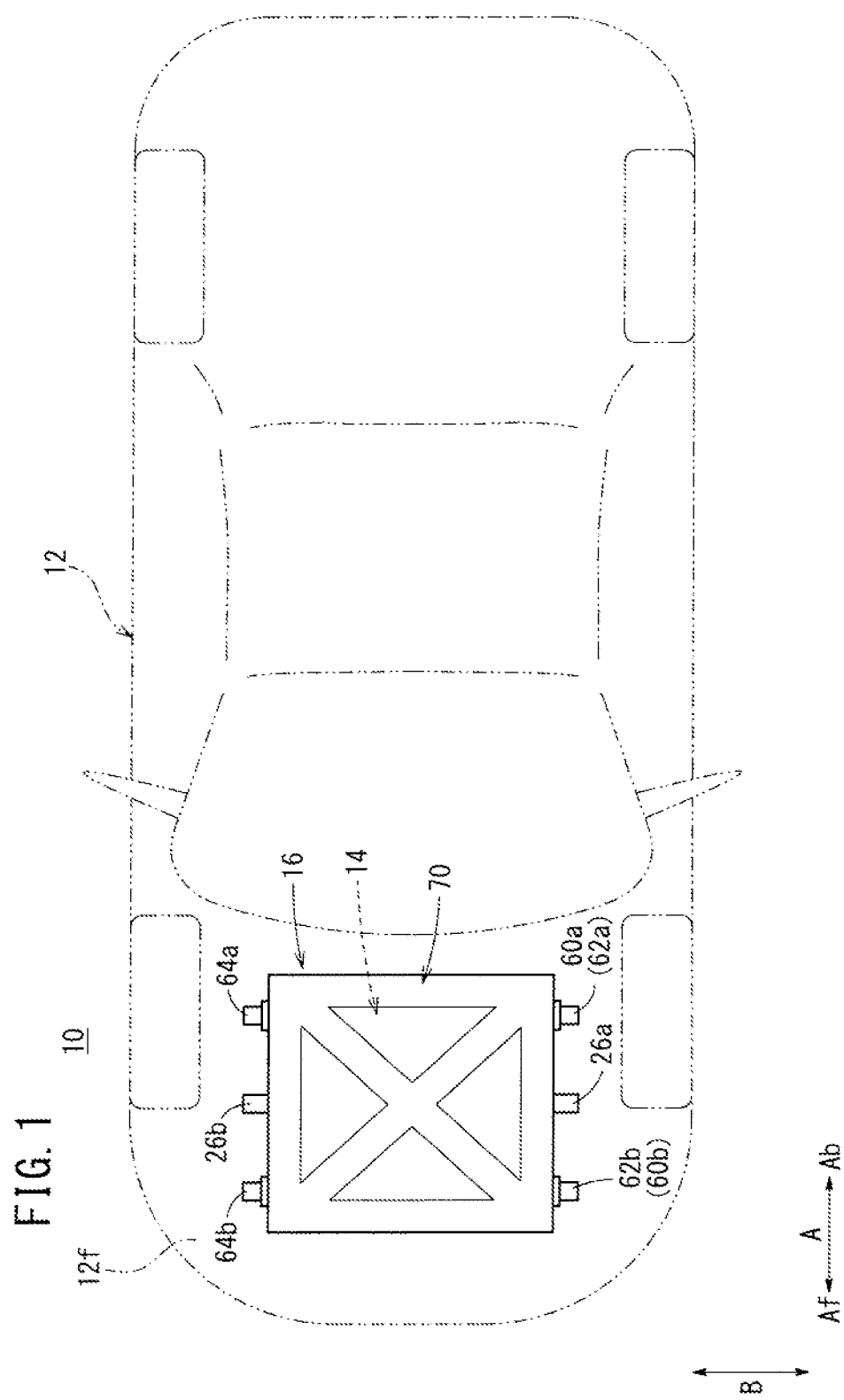
FIG. 1 is a plan view schematically showing a fuel cell electric vehicle equipped with a fuel cell stack according to a first embodiment of the present invention.
Figure 2:
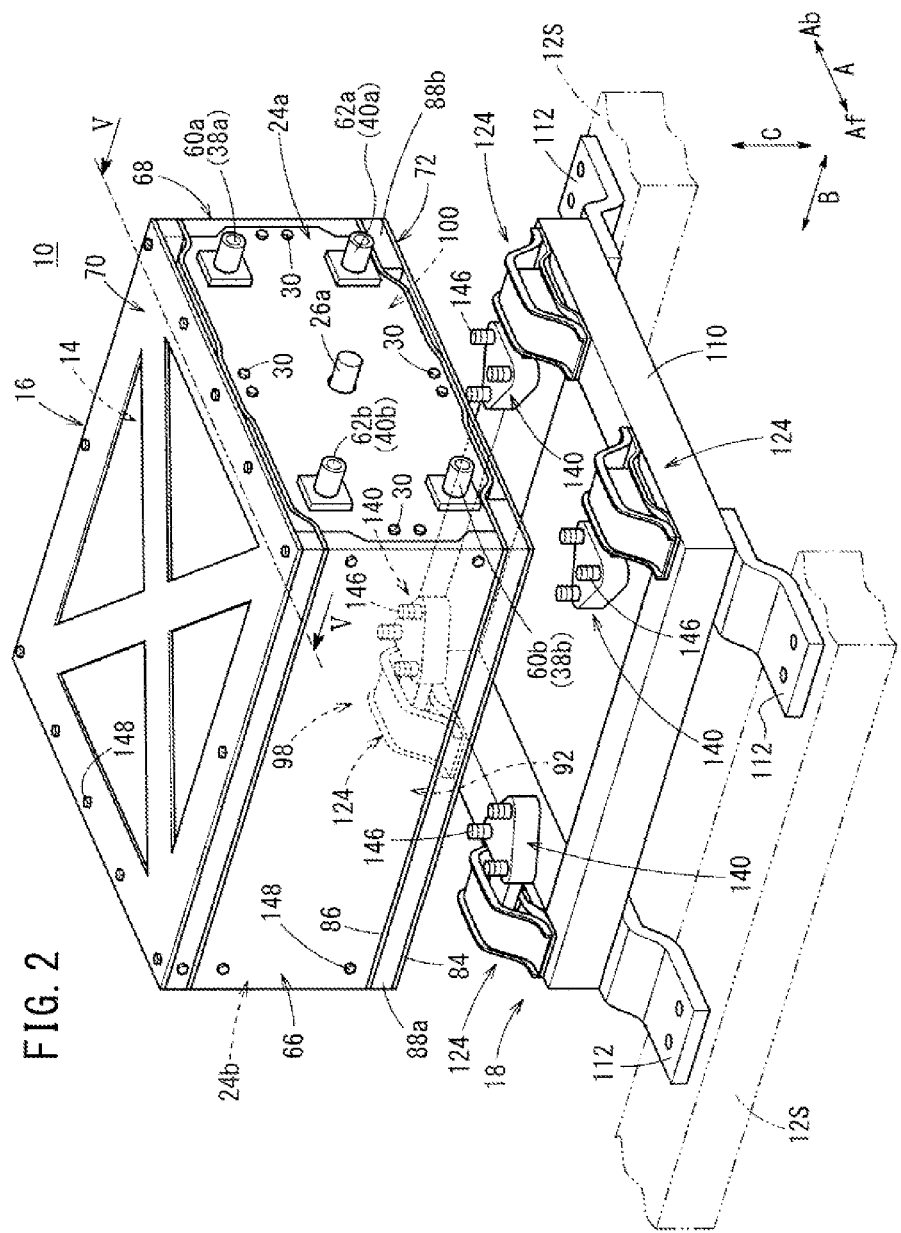
FIG. 2 is a perspective view schematically showing the fuel cell stack.

As shown in FIG. 1, a fuel cell stack 10 according to a first embodiment of the present invention is placed, for example, in a front box (so called, a motor room) 12f of a fuel cell electric vehicle (fuel cell vehicle) 12. The fuel cell stack 10 includes a plurality of fuel cells 14 which are stacked together, and a casing 16 containing the stacked fuel cells 14 (see FIGS. 1 to 3). As shown in FIG. 2, the casing 16 is mounted on a vehicle body frame (installation location) 12S of the fuel cell electric vehicle 12 using a mounting structure 18. The installation location for the fuel cell stack 10 is not limited to the front box 12f. For example, the fuel cell stack 10 may be installed under the floor at the center of the vehicle, or adjacent to a rear trunk.

Figure 3:
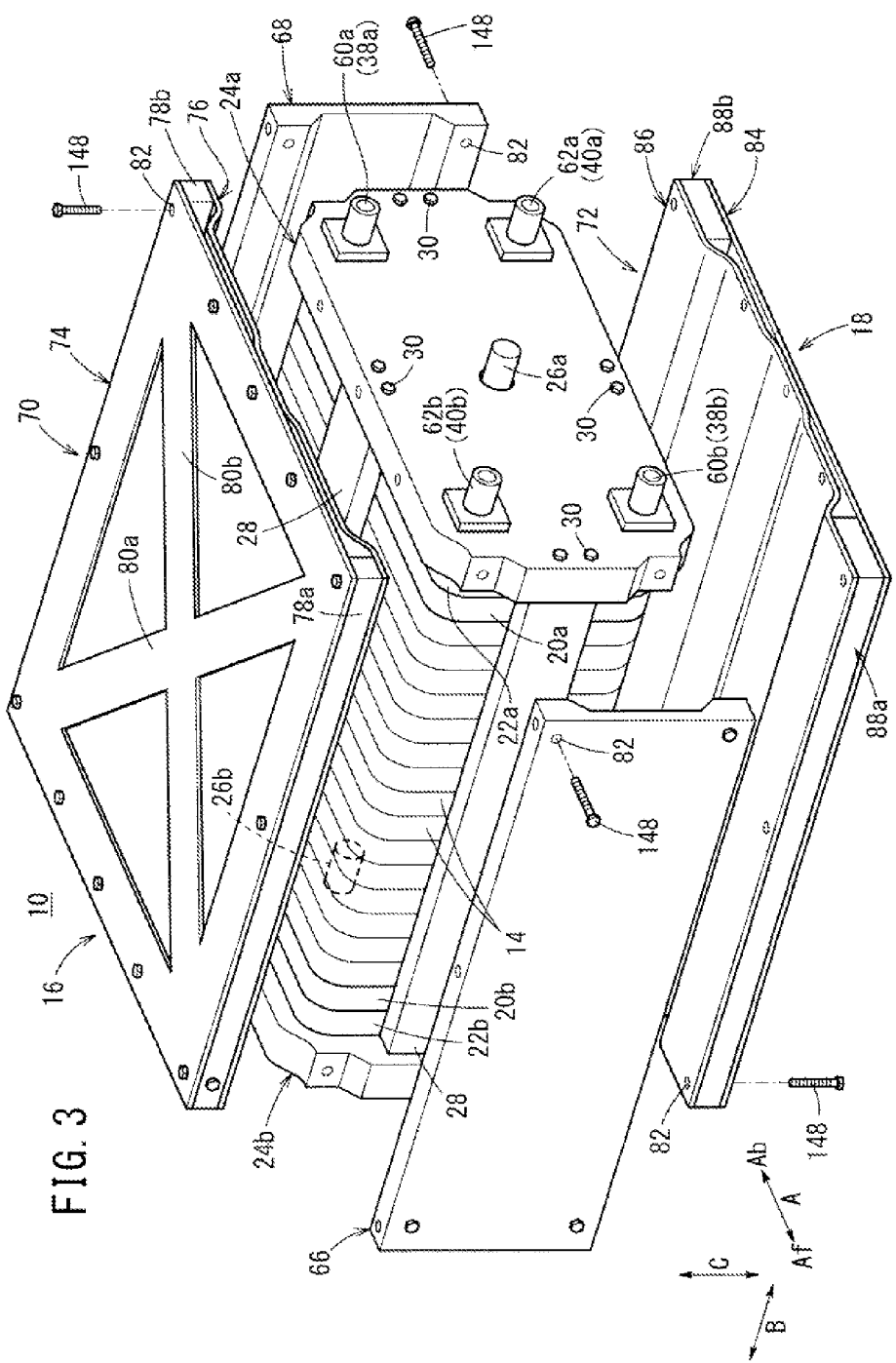
FIG. 3 is a partial exploded perspective view showing the fuel cell stack.

As shown in FIG. 3, the fuel cells 14 are stacked together in an upright posture in a vehicle width direction indicated by an arrow B intersecting with a vehicle length direction of the fuel cell electric vehicle 12 (traveling direction of the vehicle) indicated an arrow A. At one end of the fuel cells 14 in the stacking direction, a first terminal plate 20a is provided. A first insulating plate 22a is provided outside the first terminal plate 20a, and a first end plate 24a is provided outside the first insulating plate 22a. At the other end of the fuel cells 14 in the stacking direction, a second terminal plate 20b is provided. A second insulating plate 22b is provided outside the second terminal plate 20b, and a second end plate 24b is provided outside the second insulating plate 22b.

A first power output terminal 26a extends outward from a substantially central portion of the first end plate 24a having a laterally elongated shape (rectangular shape). The first power output terminal 26a may extend from a position deviated from the central portion of the first end plate 24a. The first power output terminal 26a is connected to the first terminal plate 20a. A second power output terminal 26b extends outward from a substantially central portion of the second end plate 24b having a laterally elongated shape (rectangular shape). The second power output terminal 26b is connected to the second terminal plate 20b.

Coupling bars 28 having a constant length are provided respectively between opposed sides of the first end plate 24a and the second end plate 24b such that ends of the coupling bars 28 are positioned at intermediate positions of the respective sides. Both ends of each of the coupling bars 28 are fixed to the first end plate 24a and the second end plate 24b using screws 30 for applying a tightening load to the plurality of stacked fuel cells 14 in the direction indicated by the arrow B.

Figure 4:
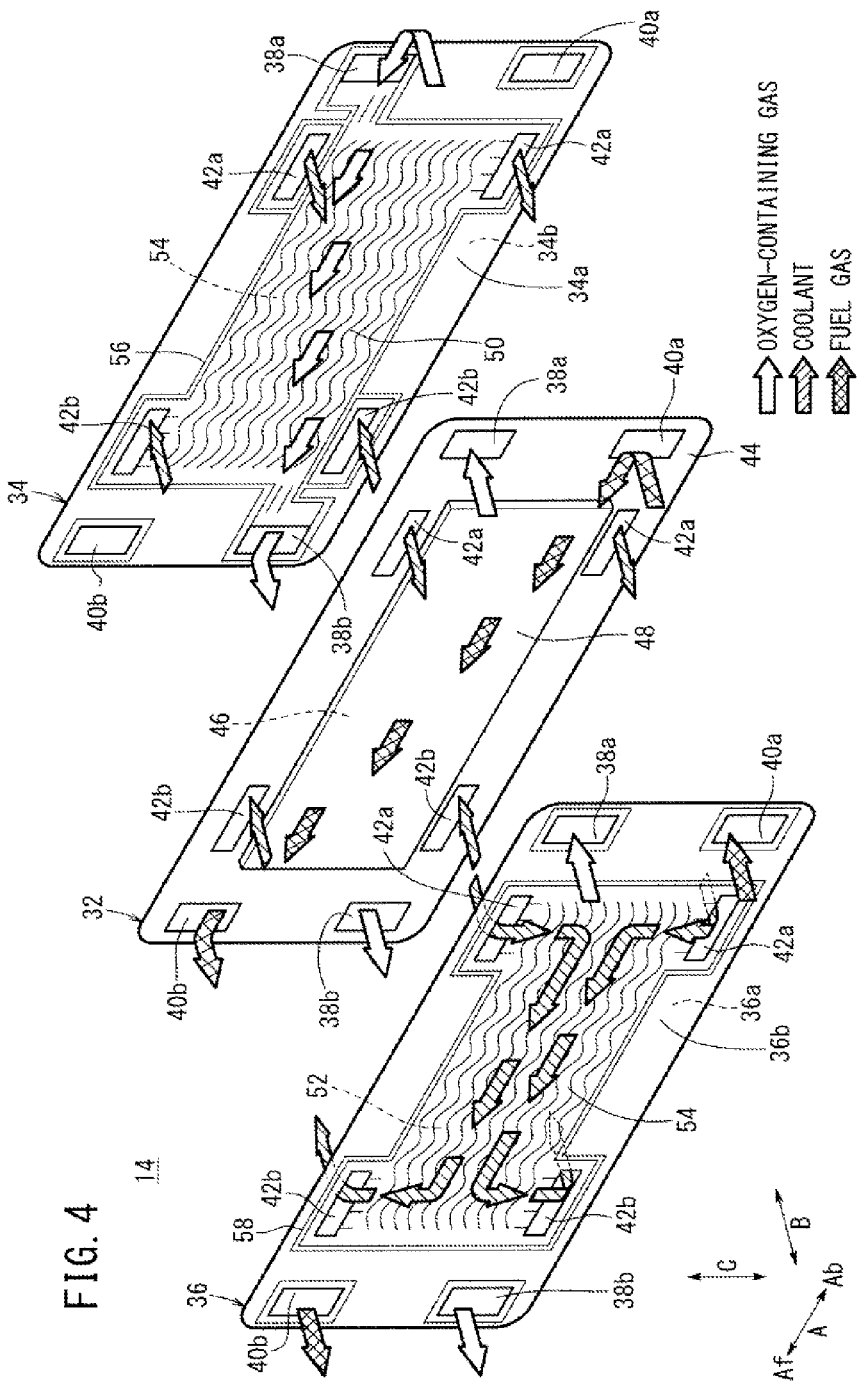
FIG. 4 is an exploded perspective view showing main components of a fuel cell of the fuel cell stack.

As shown in FIG. 4, the fuel cell 14 includes a membrane electrode assembly 32 and a cathode side separator 34 and an anode side separator 36 sandwiching the membrane electrode assembly 32.

The cathode side separator 34 and the anode side separator 36 are made of metal plates such as steel plates, stainless steel plates, aluminum plates, plated steel sheets, or metal plates having anti-corrosive surfaces by surface treatment. Each of the cathode side separator 34 and the anode side separator 36 has a rectangular planar surface, and is formed by corrugating a thin metal plate by press forming to have a corrugated shape (ridges and recesses) in cross section and a wavy or serpentine shape on the surface. Instead of the metal separators, for example, carbon separators may be used as the cathode side separator 34 and the anode side separator 36.

Each of the cathode side separator 34 and the anode side separator 36 has a laterally elongated shape, including long sides extending in the horizontal direction indicated by the arrow A and short sides in the gravity direction indicated by an arrow C. Alternatively, the short sides may extend in the horizontal direction, and the long sides may extend in the gravity direction.

At one end of the fuel cell 14 in a long-side direction indicated by the arrow A, an oxygen-containing gas supply passage 38a for supplying an oxygen-containing gas, and a fuel gas supply passage 40a for supplying a fuel gas such as a hydrogen-containing gas are provided. The oxygen-containing gas supply passage 38a and the fuel gas supply passage 40a extend through the fuel cell 14 in the direction indicated by the arrow B.

At the other end of the fuel cell 14 in the long-side direction indicated by the arrow A, a fuel gas discharge passage 40b for discharging the fuel gas and an oxygen-containing gas discharge passage 38b for discharging the oxygen-containing gas are provided. The fuel gas discharge passage 40b and the oxygen-containing gas discharge passage 38b extend through the fuel cell 14 in the direction indicated by the arrow B.

On one side at both end portions of the fuel cell 14 in the short-side direction indicated by the arrow C, i.e., on one side adjacent to the oxygen-containing gas supply passage 38a and the fuel gas supply passage 40a, two coolant supply passages 42a for supplying a coolant are provided on the respective opposite sides. The coolant supply passages 42a extend through the fuel cell 14 in the direction indicated by the arrow B. On the other side at the both end portions of the fuel cell 14 in the short-side direction, i.e., adjacent to the fuel gas discharge passage 40b and the oxygen-containing gas discharge passage 38b, two coolant discharge passages 42b for discharging the coolant are provided on the respective opposite sides. The coolant discharge passages 42b extend through the fuel cell 14 in the direction indicated by the arrow B.

The membrane electrode assembly 32 includes a cathode 46 and an anode 48, and a solid polymer electrolyte membrane 44 interposed between the cathode 46 and the anode 48. The solid polymer electrolyte membrane 44 is formed by impregnating a thin membrane of perfluorosulfonic acid with water, for example.

Each of the cathode 46 and the anode 48 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the cathode 46 and the electrode catalyst layer of the anode 48 are formed on both surfaces of the solid polymer electrolyte membrane 44, respectively.

The cathode side separator 34 has an oxygen-containing gas flow field 50 on its surface 34a facing the membrane electrode assembly 32. The oxygen-containing gas flow field 50 is connected to the oxygen-containing gas supply passage 38a and the oxygen-containing gas discharge passage 38b. The oxygen-containing gas flow field 50 includes a plurality of wavy flow grooves (or straight flow grooves) extending in the direction indicated by the arrow A.

The anode side separator 36 has a fuel gas flow field 52 on its surface 36a facing the membrane electrode assembly 32. The fuel gas flow field 52 is connected to the fuel gas supply passage 40a and the fuel gas discharge passage 40b. The fuel gas flow field 52 includes a plurality of wavy flow grooves (or straight flow grooves) extending in the direction indicated by the arrow A.

A coolant flow field 54 is formed between a surface 36b of the anode side separator 36 and a surface 34b of the adjacent cathode side separator 34. The coolant flow field 54 is connected to the coolant supply passages 42a and the coolant discharge passages 42b. In the coolant flow field 54, the coolant flows over the electrode area of the membrane electrode assembly 32.

A first seal member 56 is formed integrally with the surfaces 34a, 34b of the cathode side separator 34, around the outer circumferential end of the cathode side separator 34. A second seal member 58 is formed integrally with the surfaces 36a, 36b of the anode side separator 36, around the outer circumferential end of the anode side separator 36.

Each of the first seal member 56 and the second seal member 58 is made of seal material, cushion material, or packing material such as an EPDM (ethylene propylene diene monomer), an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

As shown in FIG. 3, an oxygen-containing gas supply manifold 60a, an oxygen-containing gas discharge manifold 60b, a fuel gas supply manifold 62a, and a fuel gas discharge manifold 62b are connected to the first end plate 24a. The oxygen-containing gas supply manifold 60a is connected to the oxygen-containing gas supply passage 38a, the oxygen-containing gas discharge manifold 60b is connected to the oxygen-containing gas discharge passage 38b, the fuel gas supply manifold 62a is connected to the fuel gas supply passage 40a, and the fuel gas discharge manifold 62b is connected to the fuel gas discharge passage 40b.

As shown in FIG. 1, a coolant supply manifold 64a and a coolant discharge manifold 64b are attached to the second end plate 24b. The coolant supply manifold 64a is connected to the pair of coolant supply passages 42a, and the coolant discharge manifold 64b is connected to the pair of coolant discharge passages 42b.

Figure 5:
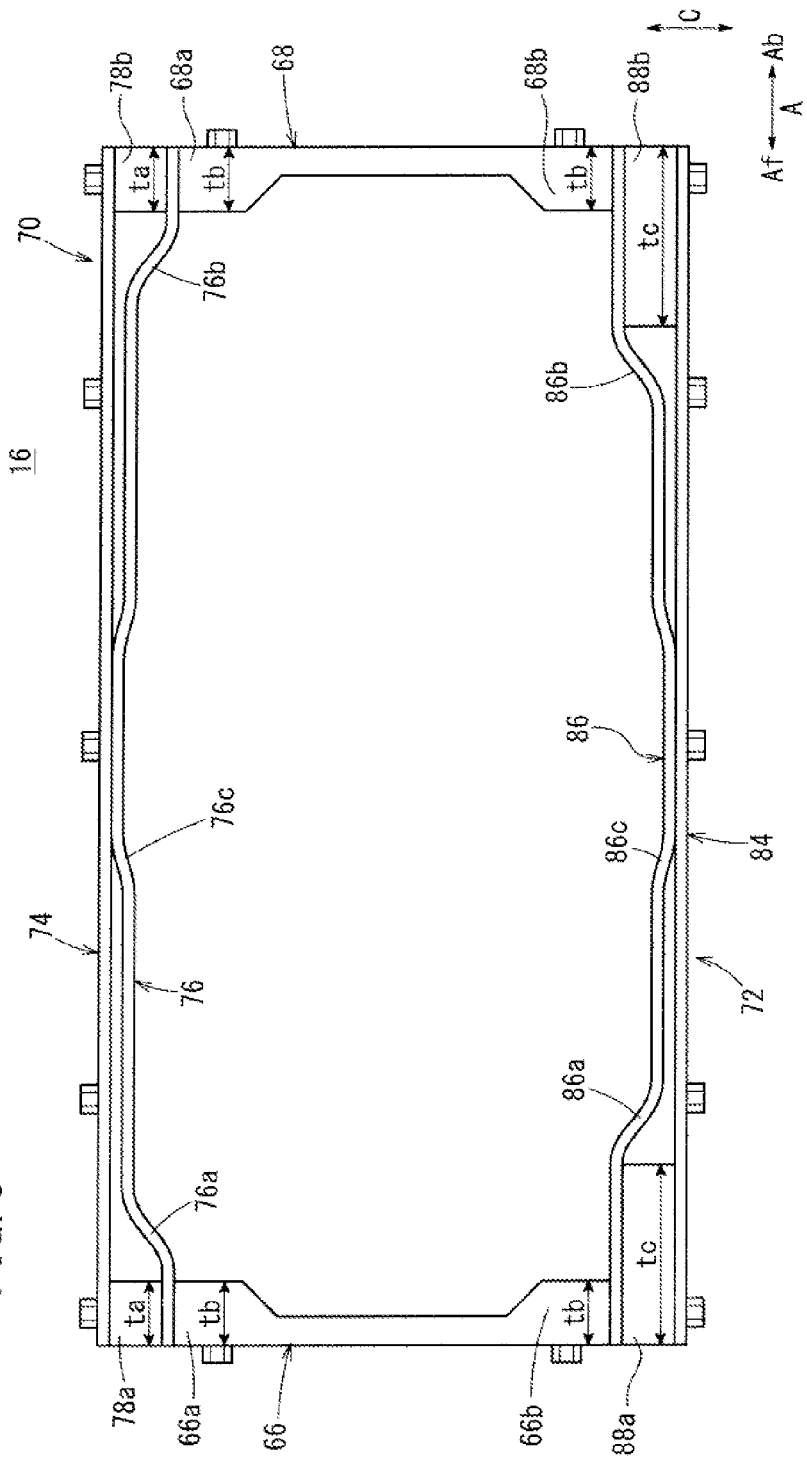
FIG. 5 is a cross sectional view showing a casing of the fuel cell stack, taken along a line V-V in FIG. 2.

The first end plate 24a and the second end plate 24b are formed as two sides (surfaces) at both ends of the casing 16 in the vehicle width direction indicated by the arrow B. As shown in FIGS. 3 and 5, a front side panel 66 and a rear side panel 68 are formed as two sides (surfaces) at both ends of the casing 16 in the vehicle length direction indicated by the arrow A. An upper side panel 70 and a lower side panel 72 are formed as two sides (surfaces) at both ends of the casing 16 in the vehicle height direction indicated by the arrow C.

For example, the front side panel 66 and the rear side panel 68 are formed by extrusion, molding, machining, or the like. The front side panel 66 has a laterally elongated plate shape arranged in the vertical direction. Inner projections 66a, 66b projecting inward of the casing 16 are formed at upper and lower positions of the front side panel 66. The inner projections 66a, 66b have a function of transmitting an external load (load from the front side) to the upper side panel 70 and the lower side panel 72. The upper side panel 70 and the lower side panel 72 have a function of protecting the fuel cell stack 10 from the loads applied in upper and lower directions.

The rear side panel 68 has a laterally elongated plate shape arranged in the vertical direction. Inner projections 68a, 68b projecting inward of the casing 16 are formed at upper and lower positions of the rear side panel 68. In the same manner as an upper side panel 70 described later, a pair of press plates and flat plate members interposed between the press plates may be used as the front side panel 66 and the rear side panel 68.

Figure 6:
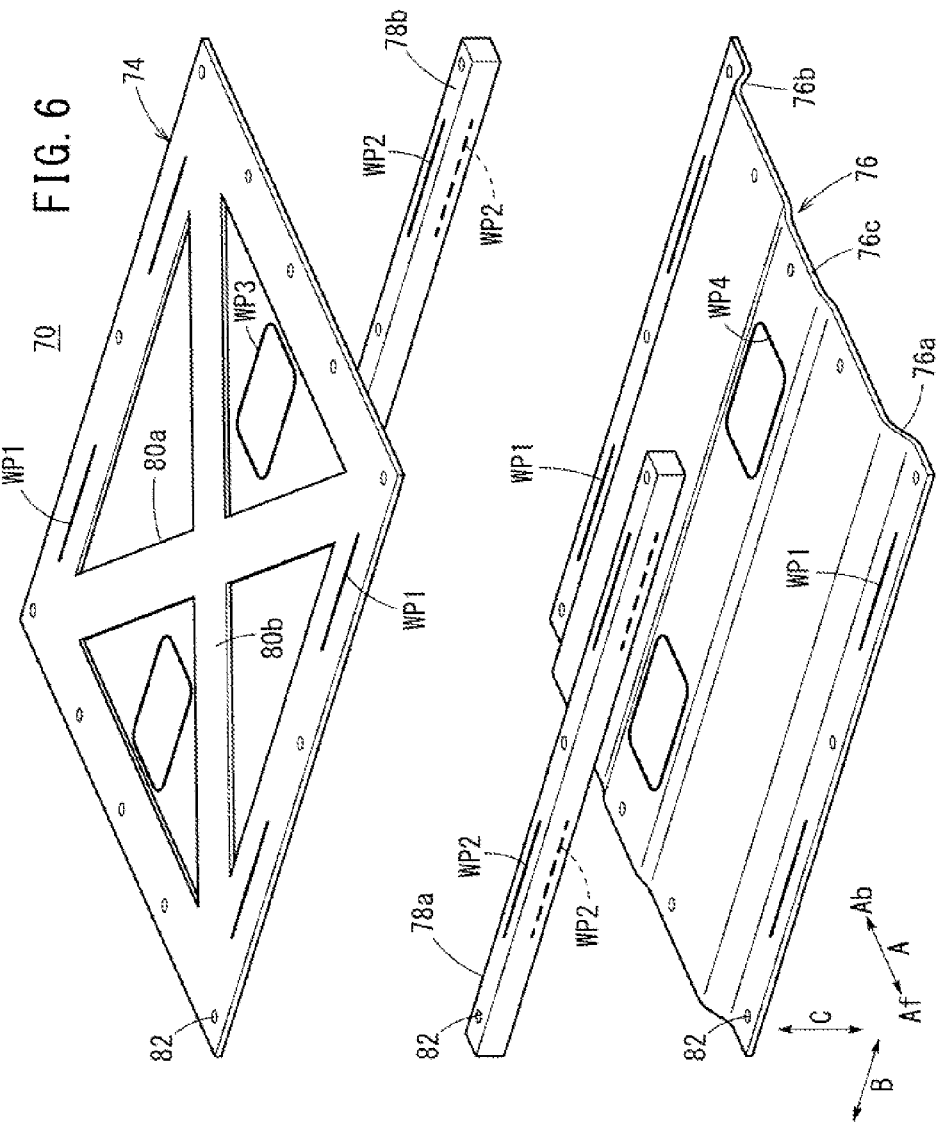
FIG. 6 is an exploded perspective view showing an upper side panel of the casing.

As shown in FIGS. 5 and 6, the upper side panel 70 includes an outer plate 74 and an inner plate 76 as a pair of press plates (plates formed by press forming) that are joined together. Each of the outer plate 74 and the inner plate 76 is a thin metal plate having corrugated surfaces (terraced surfaces) formed by press forming. Flat plate members 78a, 78b are provided between the outer plate 74 and the inner plate 76 at positions corresponding to both end portions of the outer plate 74 and the inner plate 76 (both end portions in the direction indicated by the arrow A) extending in the stacking direction indicated by the arrow B.

The outer plate 74 is a thin plate forming an upper surface of the casing 16. Ribs 80a, 80b are provided on the surface of the outer plate 74 diagonally (or in an arrangement connecting diagonal positions and opposite side positions). The surfaces of the ribs 80a, 80b are at different positions from the remaining parts of the surface of the outer plate 74 in the thickness direction. That is, the ribs 80a, 80b are provided at upper positions in the height direction (positioned to project upward).

The inner plate 76 is a thin plate forming an inner surface of the casing 16. The inner plate 76 has a curved shape or a bent shape, or has a curved and bent shape along the outer shape of the fuel cells 14. For example, curved portions 76a, 76b are formed at both end portions of the inner plate 76 in the direction indicated by the arrow A, along the curved shapes at the corners of the fuel cells 14. A deformed portion 76c is provided at the center of the inner plate 76 in the direction indicated by the arrow A. For example, the deformed portion 76c is curved (or bent) upward along the outer shape of the fuel cell stack 10, e.g., along the coupling bar 28.

The flat plate members 78a, 78b have a substantially square rod shape elongated in the direction indicated by the arrow B, and the flat plate members 78a, 78b are thicker than the outer plate 74 and the inner plate 76. Preferably, as shown in FIG.

5, the thickness to of the flat plate members 78a, 78b is substantially the same as the thickness tb of the inner projections 66a, 68a.

The flat plate members 78a, 78b are fixed to the outer plate 74 and the inner plate 76 by MIG welding or TIG welding (other fixing methods such as spot welding, brazing, or friction stir welding may be adopted). For example, two linear welding portions WP1 extending in the direction indicated by the arrow B are provided in each of both ends of the outer plate 74 and the inner plate 76 in the direction indicated by the arrow A. Two linear welding portions WP2 are provided in each of the flat plate members 78a, 78b at positions corresponding to the welding portions WP1. The welding portions WP1, WP2 are joined together.

Likewise, the outer plate 74 and the inner plate 76 are fixed together, e.g., by MIG welding, TIG welding, or the like. Two rectangular welding portions WP3 are provided on the outer plate 74 oppositely in the direction indicated by the arrow B. Two rectangular welding portions WP4 are provided on the inner plate 76 oppositely in the direction indicated by the arrow B. The welding portions WP3, WP4 are joined together. Bolt insertion holes 82 are formed in the outer plate 74, the inner plate 76, and the flat plate members 78a, 78b, at desired positions.

Figure 7:
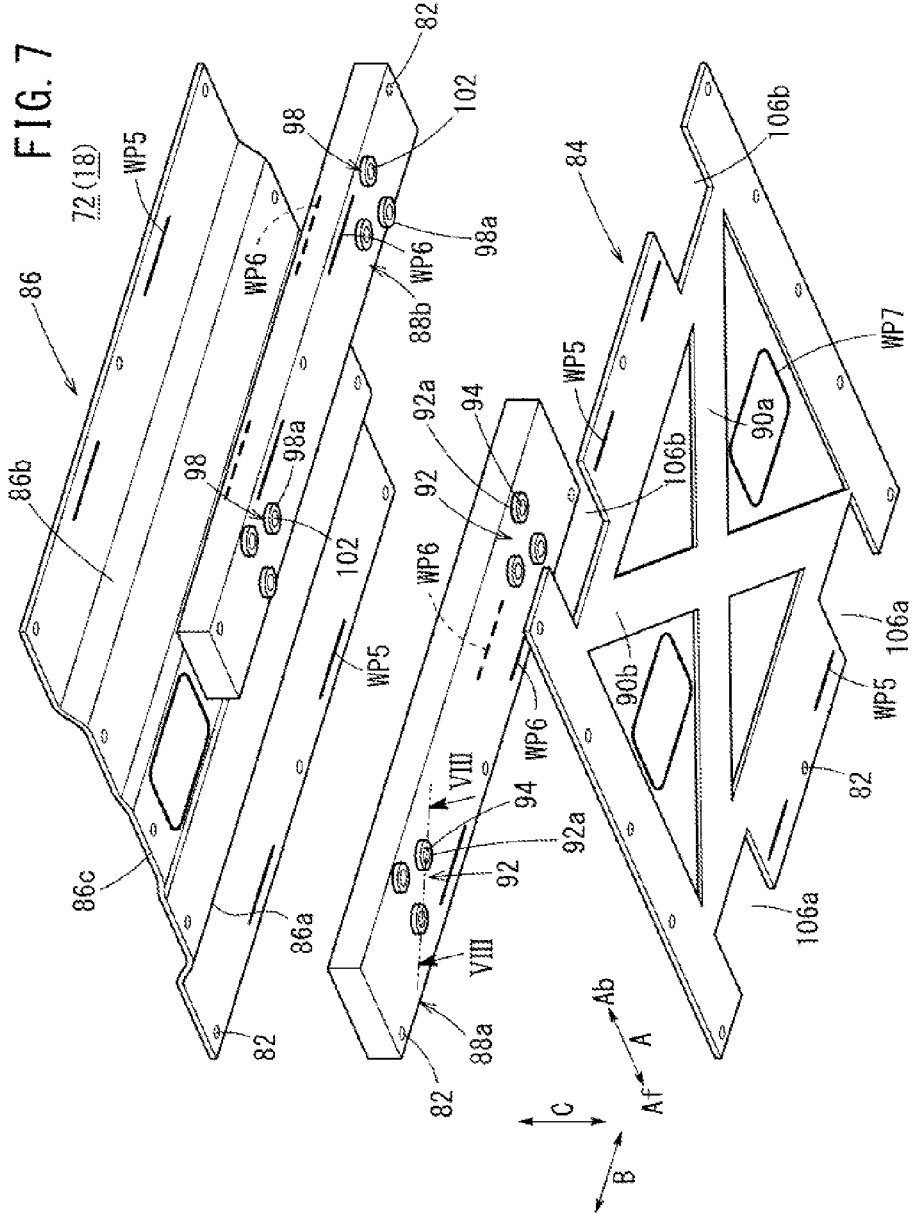
FIG. 7 is an exploded perspective view showing a lower side panel of the casing.

The lower side panel 72 has a mounting structure 18. As shown in FIGS. 5 and 7, the lower side panel 72 includes an outer plate 84 and an inner plate 86 as a pair of press plates (plates formed by press forming) that are joined together. Each of the outer plate 84 and the inner plate 86 is a thin metal plate having corrugated surfaces (terraced surfaces) formed by press forming. A first plate member 88a and a second plate member 88b are provided between the outer plate 84 and the inner plate 86 at positions corresponding to both end portions of the outer plate 84 and the inner plate 86 (both end portions in the direction indicated by the arrow A) extending in the stacking direction indicated by the arrow B.

Preferably, as shown in FIG. 5, the thickness (width) tc of the first plate member 88a and the second plate member 88b is larger than the thickness tb of the inner projections 66b, 68b. Alternatively, the thickness tc of the first plate member 88a and the second plate member 88b may have substantially the same size as the thickness tb of the inner projections 66b, 68b. The outer plate 84 and the inner plate 86 have the same structure as the above described outer plate 74 and the inner plate 76.

The outer plate 84 is a thin plate forming a lower surface of the casing 16. Ribs 90a, 90b are provided on the surface of the outer plate 84 diagonally (or in an arrangement connecting the diagonal positions and opposite side positions). The surfaces of the ribs 90a, 90b are at different positions from the remaining parts of the surface of the outer plate 84 in the thickness direction. That is, the ribs 90a, 90b are provided at lower positions in the height direction (positioned to project downward).

The inner plate 86 is a thin plate forming an inner surface of the casing 16. The inner plate 86 has a curved shape or a bent shape, or has a curved and bent shape along the outer shape of the fuel cells 14. For example, curved portions 86a, 86b are formed at both marginal end portions of the inner plate 86 in the direction indicated by the arrow A, along the curved shapes at the corners of the fuel cells 14. A deformed portion 86c is provided at the center of the inner plate 86 in the direction indicated by the arrow A. For example, the deformed portion 86c is curved (or bent) downward along the outer shape of the fuel cell stack 10, e.g., along the coupling bar 28.

As shown in FIG. 7, the first plate member 88a and the second plate member 88b extend in the direction indicated by the arrow B, and the first plate member 88a and the second plate member 88b are thicker than the outer plate 84 and the inner plate 86. The first plate member 88a positioned at a front position in the vehicle length direction indicated by an arrow Af has a substantially flat plate shape, and a pair of first fastening portions 92 are provided at both end portions of the first plate member 88a in the longitudinal direction.

Figure 8:
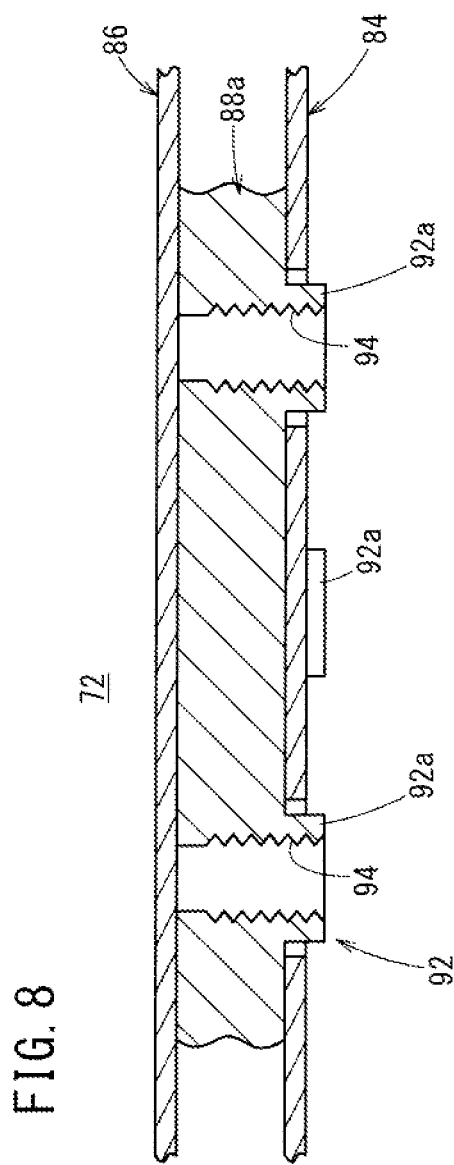
FIG. 8 is a cross sectional view showing the lower side panel, taken along a line VIII-VIII in FIG. 7.

Each of the first fastening portions 92 includes three (or two or four) attachment bosses 92a. Each of the attachment bosses 92a has a screw hole 94 (see FIG. 8). Using the attachment bosses 92a, the length of the female screws can have a large value. The attachment bosses 92a may be formed integrally with the first plate member 88a. Alternatively, as the attachment bosses 92a, separate components may be joined to the first plate member 88a. Instead of the screw holes 94, for example, stud bolts may be provided.

The second plate member 88b positioned at a rear position in the vehicle length direction indicated by an arrow Ab has a substantially flat plate shape, and a pair of second fastening portions 98 are provided at both end portions of the second plate member 88b in the longitudinal direction. Each of the second fastening portions 98 includes three (or two or four) attachment bosses 98a. Each of the attachment bosses 98a has a screw hole 102. Using the attachment bosses 98a, the length of the female screws can have a large value. The attachment bosses 98a may be formed integrally with the second plate member 88b. Alternatively, as the attachment bosses 98a, separate components may be joined to the second plate member 88b.

A pair of openings (or holes) 106a and a pair of openings 106b are formed at both end portions of the outer plate 84 in the direction indicated by the arrow A for passing the attachment bosses 92a, 98a through the openings 106a, 106b, respectively.

The first plate member 88a and the second plate member 88b are fixed to the outer plate 84 and the inner plate 86 by MIG welding or TIG welding (other fixing methods such as spot welding, brazing, or friction stir welding may be adopted). For example, two linear welding portions WP5 extending in the direction indicated by the arrow B are provided on each of both end portions of the outer plate 84 and the inner plate 86 in the direction indicated by the arrow A. Two linear welding portions WP6 are provided on each of the first plate member 88a and the second plate member 88b at positions corresponding to the welding portions WP5. The welding portions WP5, WP6 are joined together.

Likewise, the outer plate 84 and the inner plate 86 are fixed together, e.g., by MIG welding, TIG welding, or the like. Two rectangular welding portions WP7 are provided on the outer plate 84 oppositely in the direction indicated by the arrow B. Two rectangular welding portions WP8 are provided in the inner plate 86 oppositely in the direction indicated by the arrow B. The welding portions WP7, WP8 are joined together. Bolt insertion holes 82 are formed in the outer plate 84, the inner plate 86, the first plate member 88a, and the second plate member 88b at desired positions.

As shown in FIG. 2, the mounting structure 18 includes a substantially rectangular frame 110. Four legs 112 of the frame 110 each having a predetermined length are fixed to a vehicle body frame 12S of the fuel cell electric vehicle 12. In the frame 110, attachment units 124 are provided at both ends on the front side in the vehicle length direction indicated by the arrow Af and at both ends on the rear side in the vehicle length direction indicated by the arrow Ab.

Figure 9:
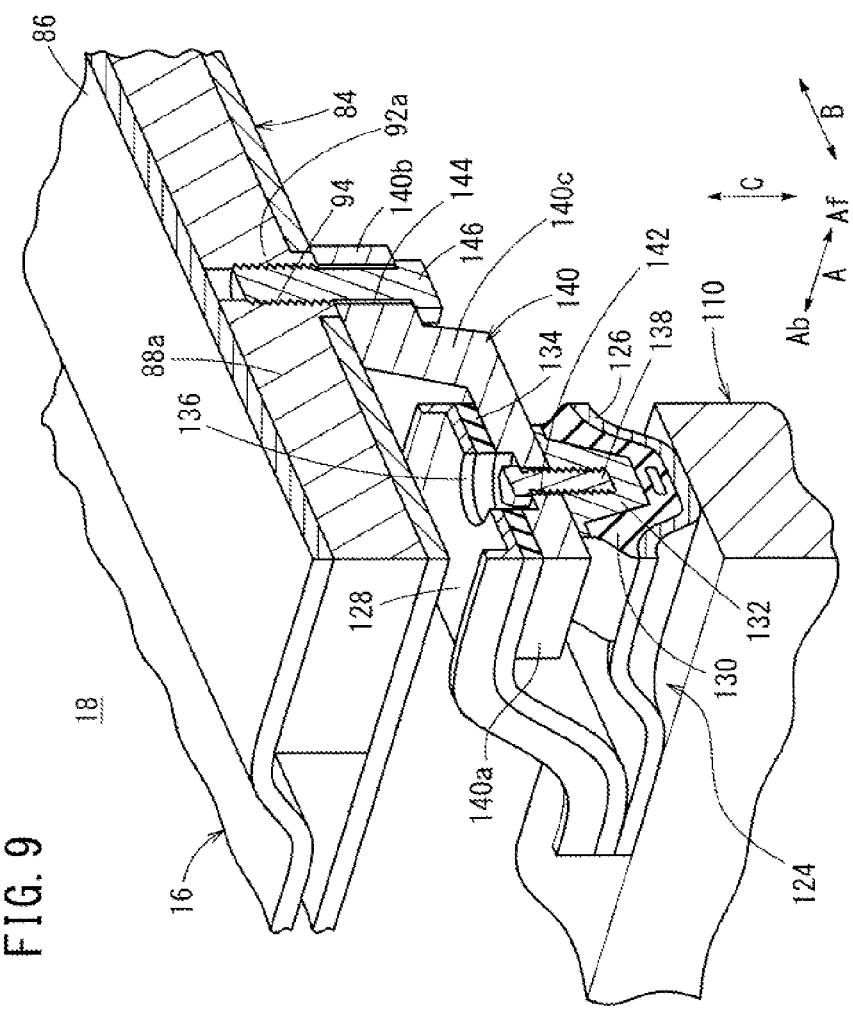
FIG. 9 is a perspective view partly in cross section showing a mounting structure and the casing.
Figure 10:
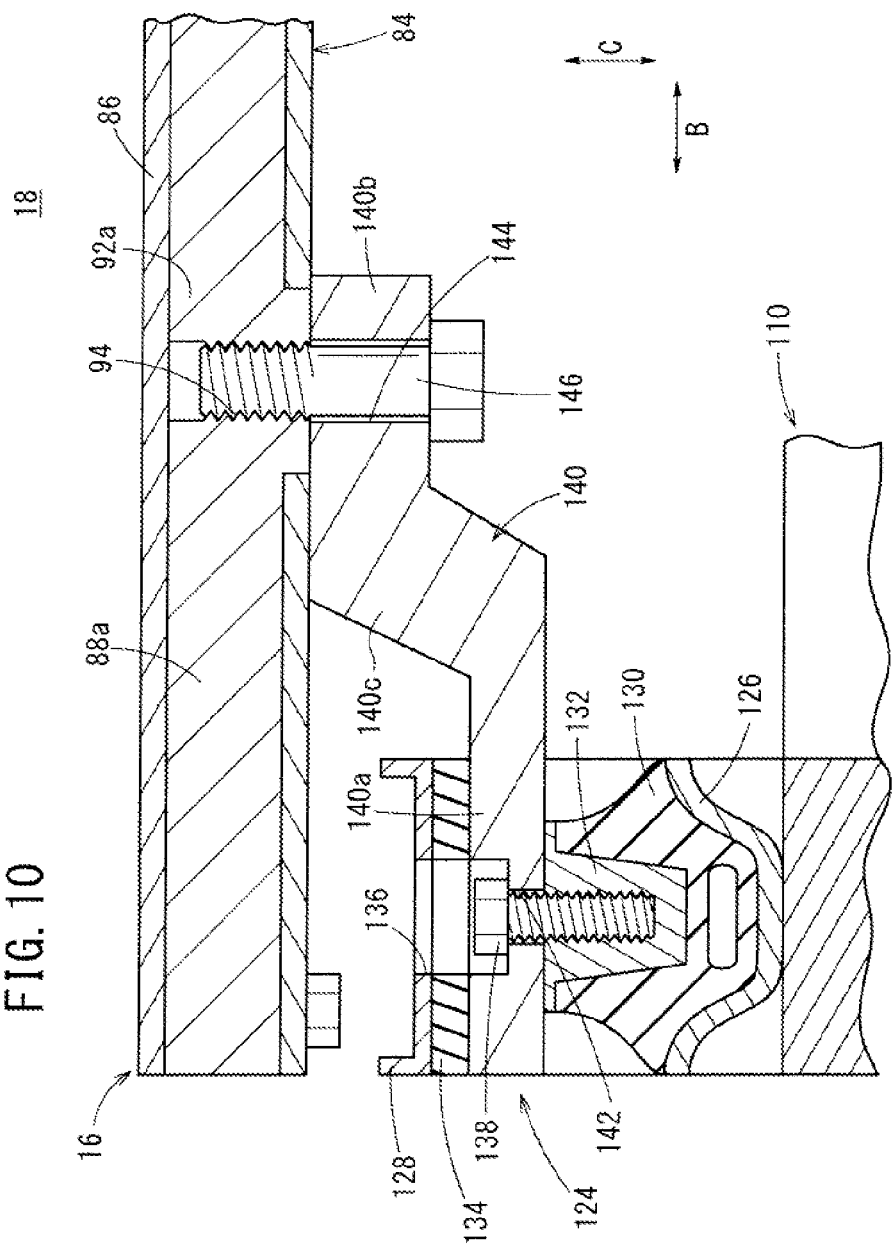
FIG. 10 is a side view of FIG. 9.

As shown in FIGS. 9 and 10, the attachment unit 124 includes two plates 126, 128 fixed onto the frame 110 using a screw. The plate 126 has a substantially U-shape in cross section, and has a female screw member 132. The female screw member 132 is embedded in elastic material, e.g., in a rubber member 130. The plate 128 is provided like a gate to cover an upper portion of the plate 126. Elastic material such as a rubber member 134 is provided on the inner surface of the plate 128.

A hole 136 is formed at an upper portion of the plate 128 coaxially with the internal threaded portion of the female screw member 132. A screw 138 is inserted through the hole 136, and a coupling member 140 is attached to the attachment unit 124 by the screw 138. One end 140a of the coupling member 140 is provided between the plates 126, 128, and the screw 138 is inserted into a hole 142 formed in the one end 140a. The screw 138 is screw-engaged into the female screw member 132. The one end 140a is held by elasticity of the rubber members 130, 134. The upper surface of the one end 140a contacts with the lower surface of the rubber member 134 without any gap.

A plurality of, e.g., three, holes 144 are formed at the other end 140b of the coupling member 140 (The number of the holes 144 can be determined as necessary.). A screw 146 is inserted into each of the holes 144. The screws 146 are screw-engaged in the screw holes 94 of the attachment bosses 92a and the screw holes 102 of the attachment bosses 98a. The coupling member 140 includes a bent portion 140c between the one end 140a and the other end 140b.

As shown in FIGS. 2 and 3, the upper side panel 70 is fixed to upper portions of the front side panel 66 and the rear side panel 68 using screws 148. The lower side panel 72 is fixed to lower portions of the front side panel 66, the rear side panel 68, the first end plate 24a, and the second end plate 24b using screws 148. The upper side panel 70, the lower side panel 72, the front side panel 66, and the rear side panel 68 are fixed to the first end plate 24a and the second end plate 24b using screws 148.

Operation of the fuel cell stack 10 will be described below.

Firstly, as shown in FIG. 2, an oxygen-containing gas is supplied from the oxygen-containing gas supply manifold 60a at the first end plate 24a to the oxygen-containing gas supply passage 38a. A fuel gas such as a hydrogen-containing gas is supplied from the fuel gas supply manifold 62a at the first end plate 24a to the fuel gas supply passage 40a. Further, as shown in FIG. 1, a coolant such as pure water, ethylene glycol, oil, or the like is supplied from the coolant supply manifold 64a at the second end plate 24b to the pair of coolant supply passages 42a.

Thus, as shown in FIG. 4, the oxygen-containing gas flows from the oxygen-containing gas supply passage 38a into the oxygen-containing gas flow field 50 of the cathode side separator 34. The oxygen-containing gas flows along the oxygen-containing gas flow field 50 in the direction indicated by the arrow A, and the oxygen-containing gas is supplied to the cathode 46 of the membrane electrode assembly 32.

In the meanwhile, the fuel gas is supplied from the fuel gas supply passage 40a to the fuel gas flow field 52 of the anode side separator 36. The fuel gas moves along the fuel gas flow field 52 in the direction indicated by the arrow A, and the fuel gas is supplied to the anode 48 of the membrane electrode assembly 32.

Thus, in the membrane electrode assembly 32, the oxygen-containing gas supplied to the cathode 46 and the fuel gas supplied to the anode 48 are consumed in the electrochemical reactions at electrode catalyst layers of the cathode 46 and the anode 48 for generating electricity.

Then, the oxygen-containing gas consumed at the cathode 46 of the membrane electrode assembly 32 is discharged along the oxygen-containing gas discharge passage 38b in the direction indicated by the arrow B. In the meanwhile, the fuel gas consumed at the anode 48 of the membrane electrode assembly 32 is discharged along the fuel gas discharge passage 40b in the direction indicated by the arrow B.

Further, the coolant supplied to the pair of coolant supply passages 42a flows into the coolant flow field 54 between the cathode side separator 34 and the anode side separator 36. The coolant firstly flows inward in the direction indicated by the arrow C, and then, the coolant moves in the direction indicated by the arrow A for cooling the membrane electrode assembly 32. After the coolant moves outward in the direction in the direction indicated by the arrow C, the coolant is discharged along the pair of coolant discharge passages 42b in the direction indicated by the arrow B.

In the first embodiment, as shown in FIGS. 5 and 6, the upper side panel 70 includes the thin outer plate 74 and the thin inner plate 76. The flat plate members 78a, 78b, which are thicker than the outer and inner plates 74, 76, are interposed between the outer plate 74 and the inner plate 76 at positions corresponding to both end portions (both end portions in the vehicle length direction) of the outer and inner plates 74, 76 extending in the stacking direction.

Therefore, the flat plate members 78a, 78b can function as reinforcement ribs, and it becomes possible to effectively reduce the thickness of the outer plate 74 and the inner plate 76. Therefore, lightweight and economical structure can be adopted as the casing 16 as a whole. Accordingly, the fuel cell stack 10 can bear an external load reliably, and it becomes possible to protect the fuel cell 14 suitably.

Further, the inner plate 76 of the upper side panel 70 includes, for example, the curved portions 76a, 76b curved along the curved shapes of the corners of the fuel cells 14, and the deformed portion 76c deformed along the coupling bar 28. The curved portions 76a, 76b and the deformed portion 76c have a reinforcing function as the ribs. Likewise, in the lower side panel 72, the inner plate 86 has a curved shape along the outer shape of the fuel cells 14, and has a reinforcing function as the rib.

Further, in the front side panel 66 and the rear side panel 68, the inner projections 66a, 66b, and 68a, 68b projecting inward of the casing 16 are formed at upper and lower positions. The inner projections 66a, 66b, and 68a, 68b minimizes the gap with the outer circumference of the fuel cell stack 10 for effectively utilizing the space, and have a reinforcing function as the ribs.

In the structure, components of the fuel cell 14 in the casing 16 are reliably and securely held together by the upper side panel 70, the lower side panel 72, the front side panel 66, and the rear side panel 68. Therefore, even if an external load is applied to the fuel cell stack 10, it is possible to protect the fuel cell 14 easily and reliably.

Furthermore, the outer plate 74 of the upper side panel 70 includes the ribs 80a, 80b which connect at least the diagonal positions of the outer plate 74 with each other and protrude upward. The outer plate 84 of the lower side panel 72 includes the ribs 90a, 90b which connect at least the diagonal positions of the outer plate 84 with each other and protrude downward. In the structure, since the outer plates 74, 84 are reinforced suitably, the size of the outer plates 74, 84 can be reduced as much as possible, and further weight reduction can be achieved.

Further, in the first embodiment, the mounting structure 18 includes the lower side panel 72 of the casing 16. The lower side panel 72 includes the outer plate 84 and the inner plate 86 provided between the first end plate 24a and the second end plate 24b, and the first plate member 88a and the second plate member 88b provided between the outer plate 84 and the inner plate 86.

Further, in the first plate member 88a, the pair of first fastening portions 92 for fixing the fuel cell stack 10 to the vehicle body frame 12S are provided. Further, in the second plate member 88b, the pair of second fastening portions 98 for fixing the fuel cell stack 10 to the vehicle body frame 12S are provided.

Therefore, the mounting structure 18 is provided under the fuel cell stack 10, and does not significantly protrude outward from the fuel cell stack 10 in the horizontal direction. Thus, the size reduction of the mounting structure 18 is achieved as a whole, and the structure is simplified easily. It becomes possible to reliably install the fuel cell stack 10 at a desired installation location (e.g., on the vehicle body frame 12S).

Further, as shown in FIGS. 9 and 10, the mounting structure 18 includes the attachment units 124 in which the rubber members 130, 134 are provided, and the coupling members 140 attached to the attachment units 124, in order to fix the lower side panel 72 to the frame 110. In the structure, the entire fuel cell stack 10 can be elastically held on the frame 110 and also on the vehicle body frame 12S. Accordingly, improvement in the vibration absorption and shock resistance can be achieved.

Further, the first fastening portions 92 as two fastening portions are provided on the first plate member 88a, and the second fastening portions 98 as two fastening portions 92 are provided on the second plate member 88b. In the structure, the fuel cell stack 10 can be supported suitably on the frame 110.

Figure 11:
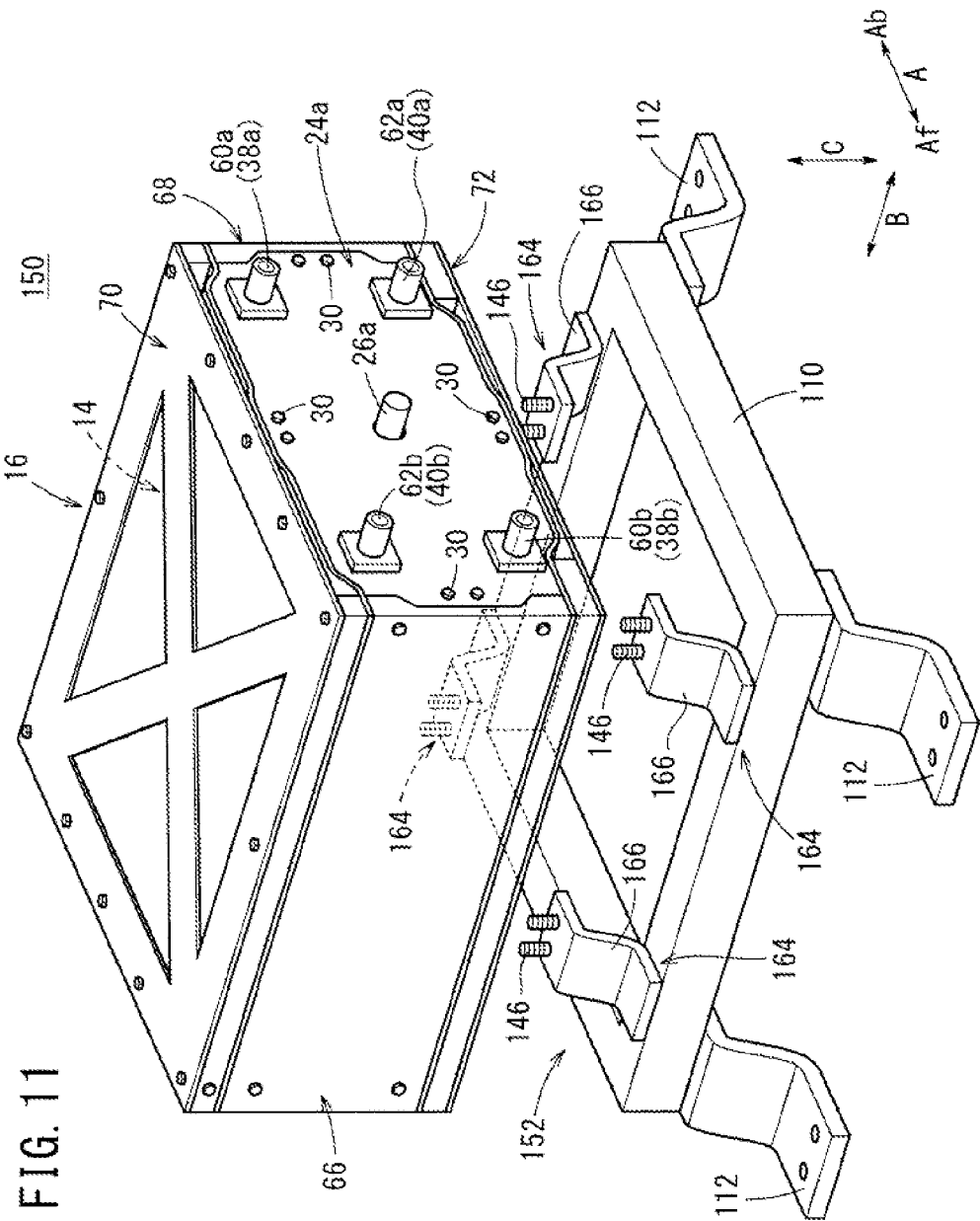
FIG. 11 is a perspective view schematically showing a fuel cell stack according to a second embodiment of the present invention.

FIG. 11 is a perspective view schematically showing a fuel cell stack 150 according to a second embodiment of the present invention. The constituent elements that are identical to those of the fuel cell stack 10 according to the first embodiment are labeled with the same reference numerals, and detailed description thereof is omitted. Also in a third embodiment described later, the constituent elements that are identical to those of the fuel cell stack 10 according to the first embodiment are labeled with the same reference numerals, and detailed description thereof is omitted.

The fuel cell stack 150 has a mounting structure 152 where attachment units 164 are provided at both ends of a frame 110 on the front side in the vehicle length direction, and at both ends of the frame 110 on the rear side in the vehicle length direction. Each of the attachment units 164 includes a plate 166 fixed onto the frame 110. The plate 166 is bent upward, and two screws 146 are inserted into a front end of the plate 166.

Figure 12:
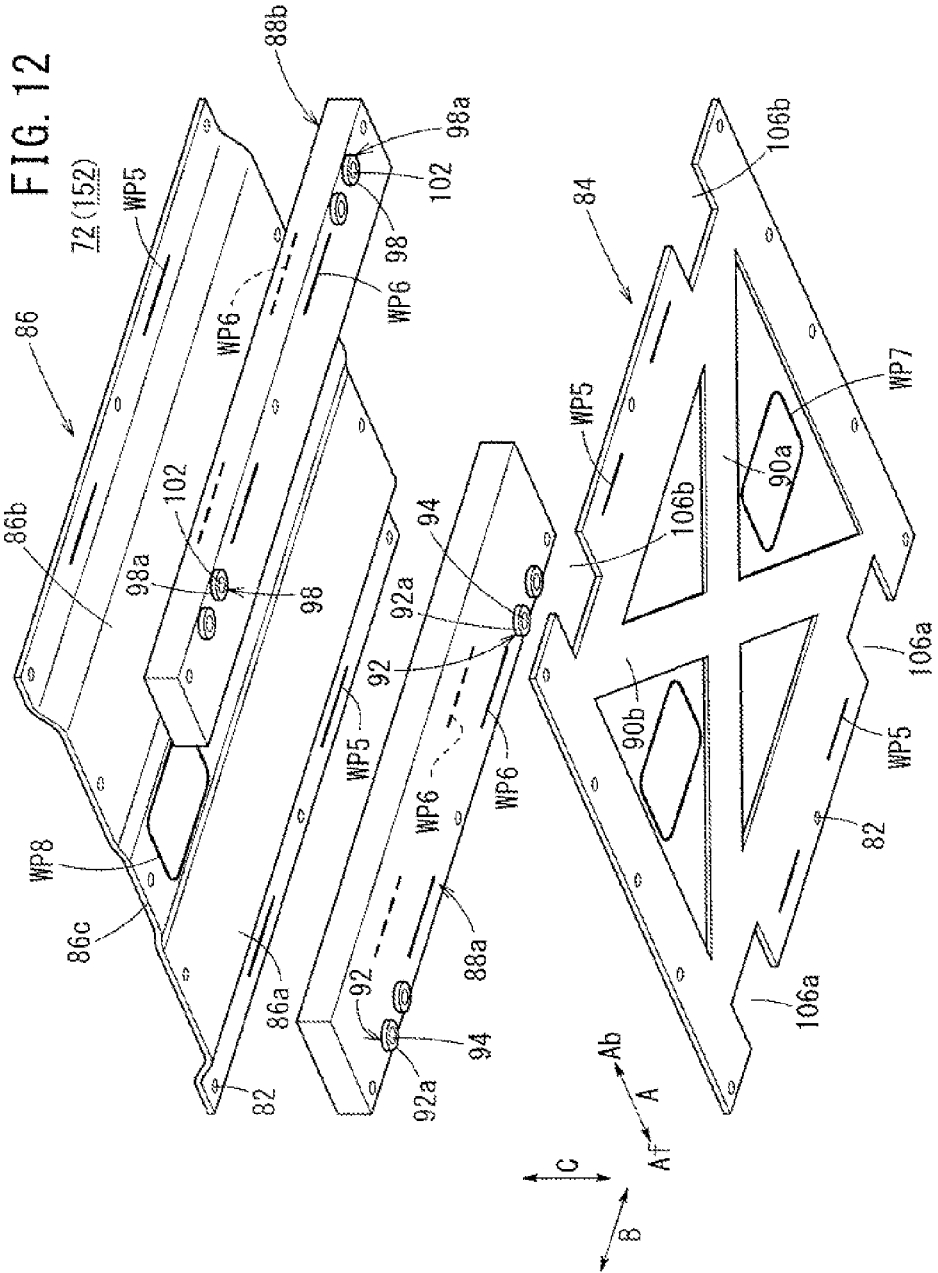
FIG. 12 is an exploded perspective view showing a lower side panel of a casing.
Figure 13:
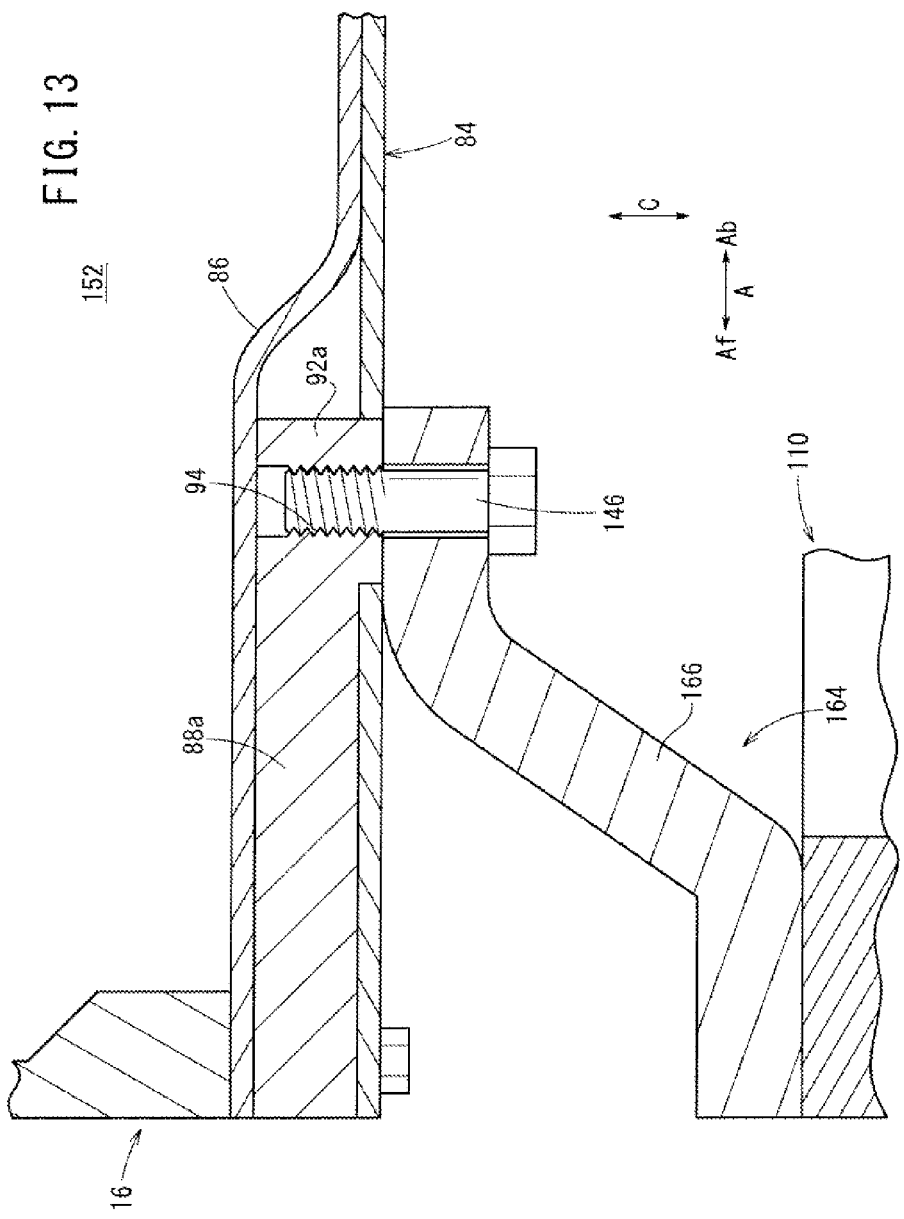
FIG. 13 is a side view showing the casing and a mounting structure.

As shown in FIG. 12, a pair of first fastening portions 92 disposed on a first plate member 88a each have two attachment bosses 92a, and a pair of second fastening portions 98 disposed on a second plate member 88b each have two attachment bosses 98a. As shown in FIGS. 12 and 13, a screw 146 is screw-engaged into each of screw holes 94 of the attachment bosses 92a and screw holes 102 of the attachment bosses 98a for fixing the casing 16 to the frame 110.

In the second embodiment, the mounting structure 152 is further simplified, and size reduction of the mounting structure 152 is achieved. Thus, the mounting structure 152 can be provided in a smaller space.

Figure 14:
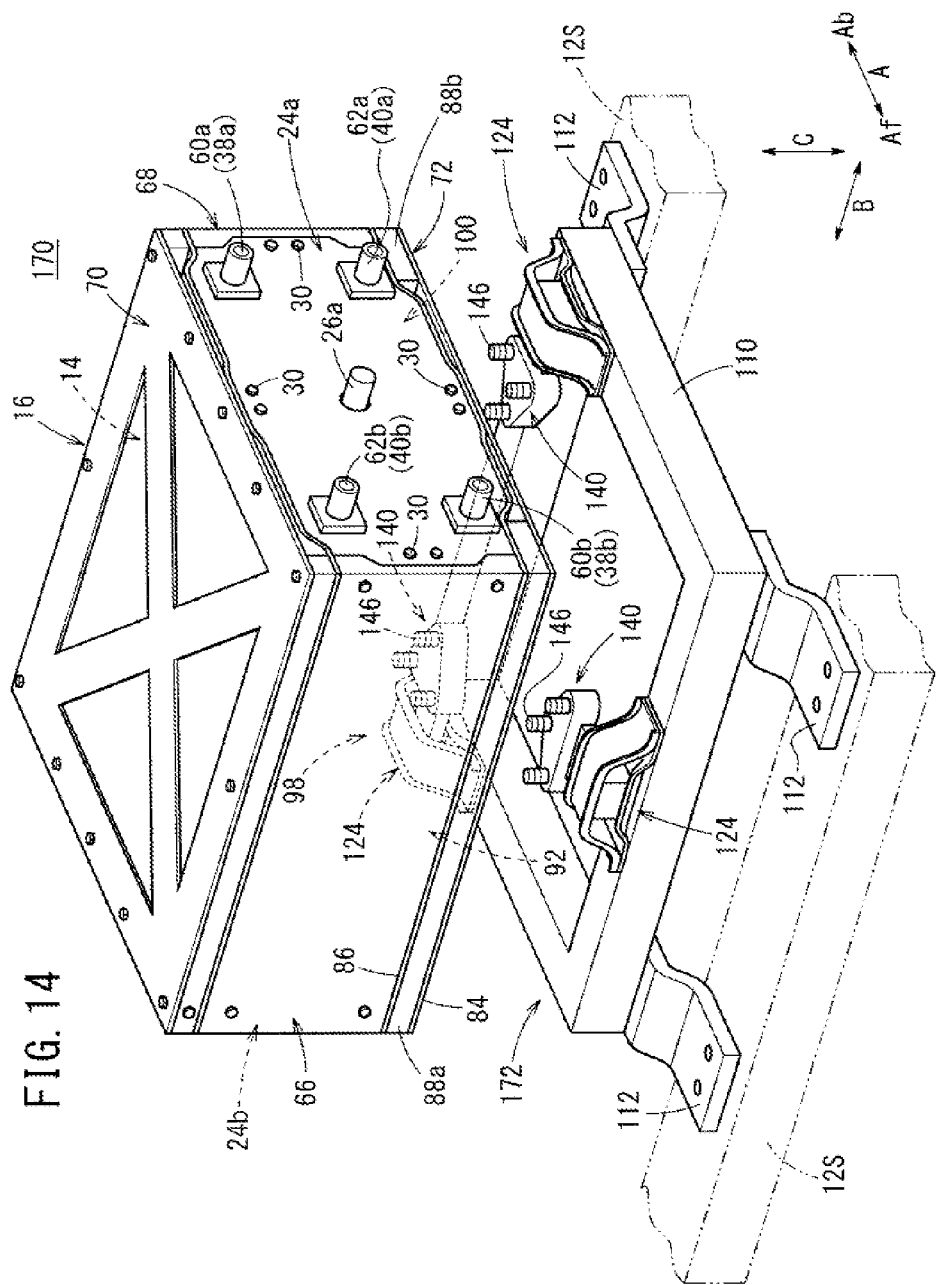
FIG. 14 is a perspective view schematically showing a fuel cell stack according to a third embodiment of the present invention.

FIG. 14 is a perspective view schematically showing a fuel cell stack 170 according to a third embodiment of the present invention.

Figure 15:
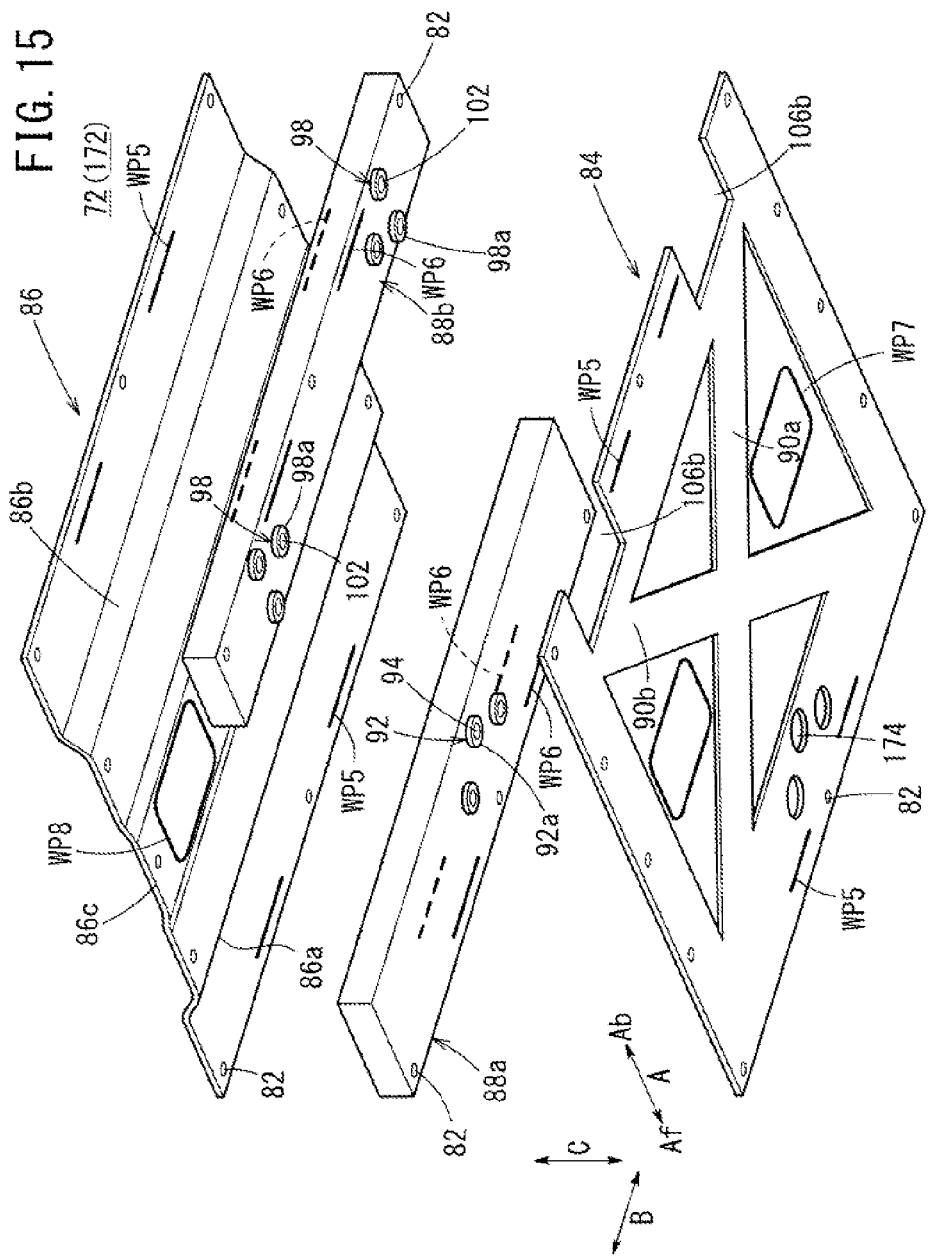
FIG. 15 is an exploded perspective view showing a lower side panel of the casing.
Figure 16:
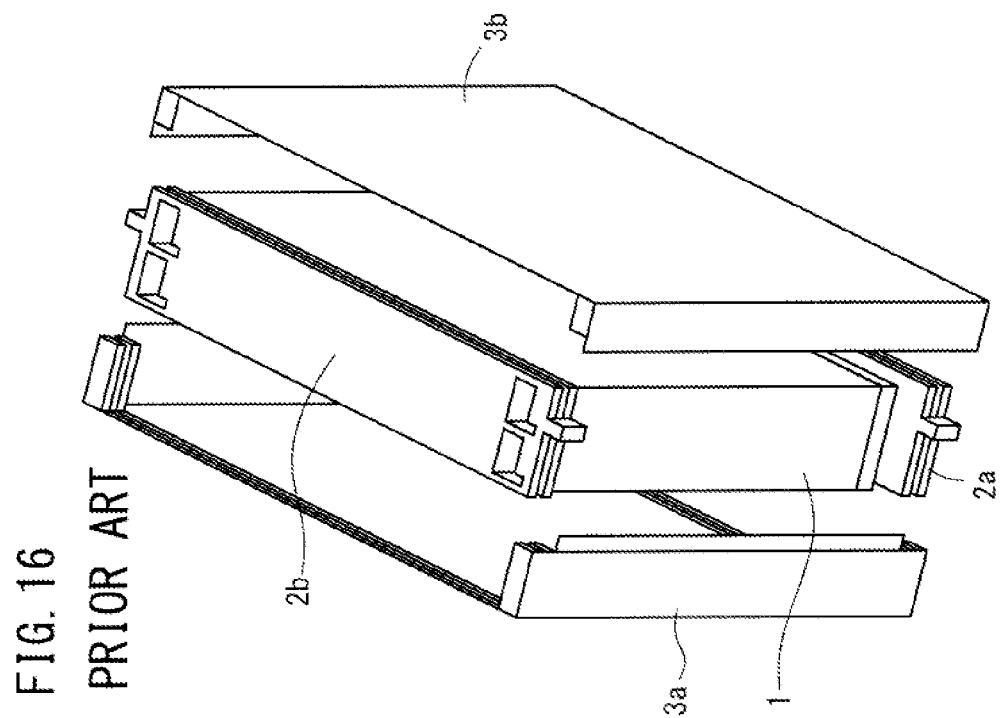
FIG. 16 is a perspective view showing fastening structure of a fuel cell stack disclosed in a conventional technique 1.

The fuel cell stack 170 has a mounting structure 172 where attachment units 124 are provided at a substantially central position of a frame 110 on the front side in the vehicle length direction, and at both ends of the frame 110 on the rear side in the vehicle length direction. As shown in FIG. 15, a first fastening portion 92 is provided adjacent to a substantially central position of a first plate member 88a in the longitudinal direction, and three holes 174 for inserting respective attachment bosses 92a are formed in an outer plate 84.

In this third embodiment, since the number of mounting positions is only three, the mounting structure 172 is further simplified, and the same advantages as in the cases of the first and second embodiments are obtained.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell stack including a plurality of fuel cells for generating electrical energy by electrochemical reactions of a fuel gas and an oxygen-containing gas, the fuel cells being stacked together horizontally in a stacking direction, a pair of end plates being provided at both ends of the fuel cells in the stacking direction, side panels being fixed between the end plates,
wherein each of the side panels includes:
a pair of press plates which are joined together;
and flat plate members interposed between the press plates at positions corresponding to both end portions of the press plates extending in the stacking direction, the flat plate members being thicker than the press plates.

2. The fuel cell stack according to claim 1, wherein the side panels include four side panels provided on respective sides of the end plates each having a rectangular shape, and inner surfaces formed by the four side panels have a curved shape or a bent shape along an outer shape of the fuel cell stack.

3. The fuel cell stack according to claim 1, wherein ribs are provided on a surface of the press plate having a rectangular shape so as to connect diagonal positions of the press plate with each other, and positions of surfaces of the ribs are different from positions of the remaining parts of the surface of the press plate in a thickness direction of the press plate.

4. The fuel cell stack according to claim 1, wherein the fuel cells are stacked in a vehicle width direction of a vehicle equipped with the fuel cells; and
upper and lower surfaces of the fuel cells are covered by the side panels each formed by joining the pair of press plates together.

5. A fuel cell stack comprising a plurality of fuel cells for generating electrical energy by electrochemical reactions of a fuel gas and an oxygen-containing gas, the fuel cells being stacked together in a stacking direction, a pair of end plates being provided at both ends of the fuel cells in the stacking direction, the fuel cell stack further comprising a mounting structure for attaching the fuel cell stack to an installation location,
wherein the mounting structure includes:
two plates which are stacked together and arranged between bottoms of the end plates; and
plate members interposed between the two plates, and
wherein fastening portions for fixing the fuel cell stack to the installation location are provided on the plate members.

6. The fuel cell stack according to claim 5, wherein each of the end plates has a rectangular shape; and
the plate members include:

a first plate member provided between one end of one side of one of the end plates and one end of one side of another of the end plates; and a second plate member provided between another end of the one side of the one of the end plates and another end of the one side of the other of the end plates.

7. The fuel cell stack according to claim 6, wherein the fastening portions include:

one or two fastening portions provided on the first plate member; and two fastening portions provided on the second plate member.

8. The fuel cell stack according to claim 5, wherein the fastening portions are fixed to the installation location using a coupling member having an elastic body.

9. The fuel cell stack according to claim 5, wherein the installation location is a vehicle frame forming part of a fuel cell equipped vehicle.

\* \* \* \* \*